US008010418B1

(12) United States Patent  
Lee

(10) Patent No.: US 8,010,418 B1  
(45) Date of Patent: Aug. 30, 2011

(54) SYSTEM AND METHOD FOR IDENTIFYING AND MANAGING SOCIAL CIRCLES

(75) Inventor: Wing K. Lee, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1115 days.

(21) Appl. No.: 11/617,709

(22) Filed: Dec. 28, 2006

(51) Int. Cl.
*G06Q 30/00* (2006.01)

(52) U.S. Cl. .................................................. 705/26.7

(58) Field of Classification Search ............ 705/26, 705/27, 26.1, 26.2, 26.25, 26.3, 26.35, 26.4, 705/26.41–26.44, 26.5, 26.61–26.64, 26.7, 705/26.8, 26.81, 26.82, 26.9, 27.1, 27.2
See application file for complete search history.

(56) References Cited

U.S. PATENT DOCUMENTS

| | | | |
|---|---|---|---|
| 5,710,887 A * | 1/1998 | Chelliah et al. ................. | 705/26 |
| 6,259,405 B1 | 7/2001 | Stewart et al. | |
| 6,438,579 B1 * | 8/2002 | Hosken .......................... | 709/203 |
| 7,330,112 B1 | 2/2008 | Emigh et al. | |
| 7,636,779 B2 * | 12/2009 | Hayashi et al. ................ | 709/224 |
| 7,689,452 B2 * | 3/2010 | Lam et al. ...................... | 705/10 |
| 2001/0037192 A1 | 11/2001 | Shimamoto et al. | |
| 2002/0076032 A1 | 6/2002 | Rodriguez et al. | |
| 2002/0194246 A1 | 12/2002 | Moskowitz et al. | |
| 2003/0167234 A1 | 9/2003 | Bodmer et al. | |
| 2004/0059708 A1 | 3/2004 | Dean et al. | |
| 2004/0198398 A1 * | 10/2004 | Amir et al. ................. | 455/456.6 |
| 2004/0203746 A1 * | 10/2004 | Knauerhase et al. ....... | 455/432.1 |
| 2004/0215793 A1 * | 10/2004 | Ryan et al. ................... | 709/229 |
| 2005/0021225 A1 | 1/2005 | Kantarjiev et al. | |
| 2005/0113107 A1 * | 5/2005 | Meunier .................... | 455/456.1 |
| 2005/0125240 A9 | 6/2005 | Speiser et al. | |
| 2005/0198131 A1 * | 9/2005 | Appelman et al. ............ | 709/204 |
| 2005/0273372 A1 | 12/2005 | Bowne et al. | |
| 2006/0112079 A1 | 5/2006 | Holt et al. | |
| 2006/0217991 A1 | 9/2006 | Blake et al. | |
| 2007/0060099 A1 * | 3/2007 | Ramer et al. .................. | 455/405 |
| 2007/0234216 A1 | 10/2007 | Fitzpatrick et al. | |
| 2007/0239552 A1 * | 10/2007 | Sundaresan ..................... | 705/26 |
| 2008/0027634 A1 | 1/2008 | Obradovich et al. | |
| 2008/0102856 A1 * | 5/2008 | Fortescue et al. .......... | 455/456.1 |
| 2008/0177584 A1 | 7/2008 | Altaf et al. | |
| 2009/0198624 A1 | 8/2009 | Eagle, III | |
| 2009/0249451 A1 * | 10/2009 | Su et al. ............................ | 726/5 |
| 2009/0325551 A1 | 12/2009 | Zellner et al. | |

OTHER PUBLICATIONS

Henry Kautz, et. al. "Combining Social Networks and Collaborative Filtering", Communications of the ACM, Mar. 1997, vol. 40, No. 3, pp. 63-65.*

Guy et al. "Personalized Recommendation of Social Software Items Based on Social relations", 2009 ACM 978-1-60558-435- May 9, 2010.*

Nadav Aharony "When Worlds Collide: Impression, Identity, and Trust Management on the Border Between Online and Real-World Interactions", MAS.960: Signals, Truth and Design, Dec. 2007.*

(Continued)

*Primary Examiner* — Naeem Haq

(57) ABSTRACT

A system for identifying and managing social circles is provided that includes a data store and instructions. The data store stores a social circle that lists individuals. The social circle members are identified by monitoring individuals that a customer communicates with via the customer's mobile device. The data store further maintains recommendations and purchase histories associated with the individuals of the social circle. When instructions are executed by a processor, the processor promotes managing the individuals of the social circle, searching for businesses and products, and retrieving recommendations and purchase histories from the data store that are associated with the searched businesses and products.

2 Claims, 7 Drawing Sheets

OTHER PUBLICATIONS

Nan Li et al. "Multi-Layered Friendship Modeling for Location-Based Mobile Social Networks", Department of Computer Science, University of Massachusetts Lowell.*

Lee, Wing K., "Context Based Service Delivery", U.S. Appl. No. 11/617,710, filed Dec. 28, 2006 (20 pages).
Office Action dated Nov. 4, 2010, U.S. Appl. No. 11/617,710.
Final Office Action dated Apr. 13, 2011, U.S. Appl. No. 11/617,710.

* cited by examiner

SYSTEM AND METHOD FOR IDENTIFYING AND MANAGING SOCIAL CIRCLES

CROSS-REFERENCE TO RELATED APPLICATIONS

This application has subject matter related to U.S. patent application Ser. No. 11/617,710, entitled "Context Based Service Delivery", inventor Wing K. Lee, filed on Dec. 28, 2006, which is hereby incorporated by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates generally to systems and methods for storing and retrieving information. More particularly, the present invention relates to various embodiments of systems and methods for storing information, including recommendations and purchase history of products and services, associated with a customer's social circle and subsequently retrieving that information, wherein the customer's social circle may be identified by monitoring the customer's mobile communications device use.

BACKGROUND

When considering the purchase of a product or service, many often turn to family, friends, and co-workers for recommendations. For example, we may seek a restaurant recommendation or advice about a reliable but affordable brand of refrigerator. We turn to the people closest to us for recommendations and advice because they are familiar with us and thus will offer recommendations and advice that are likely to be consistent with our own personal tastes, preferences, and lifestyles. However, while their recommendations may be helpful, such advice is not always timely. When shopping at a local appliance store for a refrigerator or looking for a restaurant in which to enjoy a spontaneous dinner out, we need a recommendation on the spot and do not necessarily have time to call family and friends for one.

The Internet offers an alternative, near instantaneous source of information. Using a cellular telephone with Internet service or a laptop computer with wireless Internet connectivity, we may search for and obtain information about reliable but affordable refrigerators or recommendations of restaurants located in our general vicinity. A drawback to recommendations and advice obtained in this manner is that with rare exception, those recommendations and advice are provided by individuals who do not know us, do not know our personal tastes and preferences, and are not familiar with our lifestyles.

SUMMARY

According to one embodiment, a system for managing social circles is provided that includes a data store and instructions. The data store stores a social circle that lists individuals. The social circle members are identified by monitoring individuals that a customer communicates with via the customer's mobile device. The data store further maintains recommendations and purchase histories associated with the individuals of the social circle. When the instruction is executed by a processor, the processor promotes managing the individuals of the social circle, promotes searching for businesses and products, and also promotes retrieving recommendations and purchase histories from the data store that are associated with the searched businesses and products.

According to one embodiment, a method is provided for managing social circles. The method includes a customer of a wireless telecommunications provider communicating with one or more individuals using the customer's wireless device. The method includes the wireless telecommunications provider identifying the individuals with whom the customer communicates. The method includes defining a social circle based on the individuals identified by the wireless telecommunication provider. The method also includes the customer basing purchase decisions on recommendations of at least some of the individuals defined in the social circle.

In another embodiment, a computer-readable medium is provided for storing instructions. When the instructions are executed by a processor, it causes the processor to associate one or more categories of products or services with at least one member of a social circle. The social circle includes individuals that a customer communicates with using mobile communication devices. The processor also retrieves recommendations and purchase histories of the members of the social circle associated with the one or more categories of products or services.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
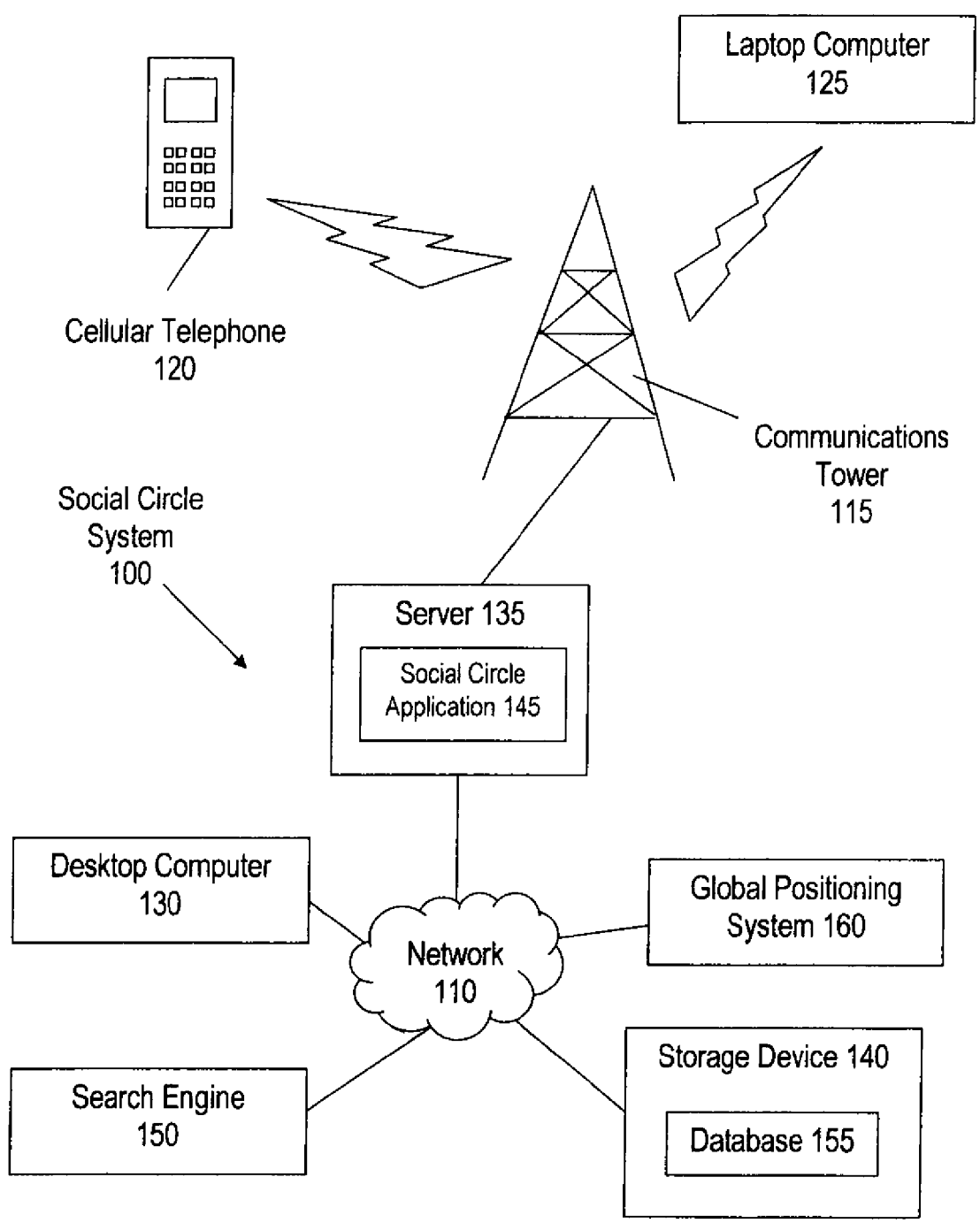
FIG. 1 is a block diagram of an illustrative system for managing social circles.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A system for identifying and managing social circles, also referred to herein as a social circle system, that is maintained by a telecommunications company and provides a readily available source of information for products and services recommended and/or purchased by members of a customer's social circle, whether they be family, friends, or co-workers. The telecommunications provider monitors contacts made by the customer using the customer's cellular telephone, pager, push-to-talk device, text messaging, and instant messaging and stores identified contacts as the first level of the customer's social circle. The customer may manage the social circle, for instance, by adding or deleting members. The customer may also create one or more smaller, lower-level social circles within the first level social circle, for example, one including family members and another including co-workers. Recommendations and purchases of products and services made by members of the customer's social circle are also stored as part of the social circle system.

Using a cellular telephone, laptop computer with wireless connectivity, or networked desktop computer, these recommendations and purchases are retrieved, or pulled, by the customer at will and transmitted, or pushed, by the social circle system upon the happening of a triggering event, such as an Internet search or online purchase. In this way, the customer is provided with recommendations and advice that carry more weight, or have more significance to the customer, because this information is offered by individuals who the customer knows directly or are linked to others the customer knows, rather than by strangers who the customer has no knowledge of their personal tastes, preferences, and lifestyle. Moreover, this information may be provided at the same speed information could be retrieved using a typical Internet search engine, like Google or Yahoo, and without human intervention.

The social circle system also provides presence information. It monitors and provides the physical location of members of the customer's social circle when those members are in proximity to the customer using a global positioning system or location sensing system that tracks signals transmitted by mobile communications devices carried by members of the customer's social circle. The degree of proximity needed to trigger the social circle system causing it to provide presence information to the customer varies from one member of the social circle to the next depending on the member's profile. If a member resides in the same city as the customer, and therefore is expected to be physically located within the customer's home city, the social circle system is configured to report that member's presence information only when the member is in close proximity to the customer, for instance, less than a mile away. On the other hand, if a member resides in a different city than the customer, and therefore is not expected to be physically located in the customer's home city, the social circle system is configured to report that member's presence information when that member is determined to be within the customer's home city and not simply less than a mile away.

Like recommendations and purchase history, presence information may also affect the customer's personal choices. For example, if the customer knows a relative is at a nearby Starbuck's, the customer may choose to alter their plans for the day to join the relative. As another example, a customer may elect to take a different flight than originally intended if the customer knows a friend has purchased a plane ticket leaving at a different time or on another carrier. As still another example, a customer may call a business associate to arrange an impromptu meeting if the customer or business associate is traveling outside of their normal geographic location and both are found to be in the same geographic area.

A telecommunications provider may execute methods for identifying and managing social circles using the illustrative social circle system 100 depicted in FIG. 1. In this embodiment, the system 100 comprises a computer network 110, a communications tower 115, and mobile communications devices, including a cellular telephone 120 and a laptop computer with wireless communication capability 125. The computer network 110 further comprises a desktop computer 130, a server 135, a storage device 140, a search engine 150, and a global positioning system 160. A social circle application 145 is stored on server 135 and has access through the computer network 110 to the search engine 150 and a database 155 stored on the storage device 140. Mobile communications devices, like the cellular telephone 120 and laptop 125, and landline computers, like the desktop computer 130, access the social circle application 145 through the communications tower 115 and the computer network 110, respectively.

The database 155 stores the social circle defined by the telecommunications provider for each customer. To define a customer's social circle, the telecommunications provider monitors the contacts that the customer makes using the cellular telephone 120 telephone, laptop computer 125, pager, push-to-talk device, text messaging, and instant messaging and stores identified contacts as the first level of the customer's social circle in the database 155. For each member of the customer's social circle, information including recommendations and purchasing history for products and services, is also stored in the database 155. In some embodiments, the server 135 stores the physical location of each member of the customer's social circle, as determined by the global positioning system 160 or other location sensing system, in the database 155.

The search engine 150 may be a typical Internet search engine, such as Google or Yahoo or other public or private search engines, and is accessible to the customer from within the social circle application 145 for browsing and looking up information. A drop-down window within the social circle application 145 provides a link to the search engine 150. In some embodiments, the social circle application 145 may provide links to more than one search engine 150.

The global positioning system 160 or other location sensing system continuously tracks signals transmitted by mobile communications devices, including cellular telephones 120, carried by the customer as well as members of the customer's social circle. The server 135 receives this information from the GPS 160, or other location sensing system, and stores it in the database 155. Using this information, the server 135 determines the proximity of the customer to members of the social circle. If the customer is in proximity to a member of the social circle, the server 135 may push the identity of the member and the member's location to the customer via the customer's cellular telephone 120, or other mobile communications device.

The social circle application 145 is a software tool which allows a user, here a telecommunications service customer, to access and manage their social circle, to associate members in the first level of their social circle in smaller, lower-level groups, or mini-social circles, to specify social circle preferences, to conduct an Internet search using the search engine 150, and to retrieve information stored in the database 155 using drop-down menus and/or text boxes available within the application 145. The customer accesses the social circle application 145 through the cellular telephone 120 or laptop computer 125 via the communications tower 115 and/or desktop computer 130 via the computer network 110.

Figure 2:
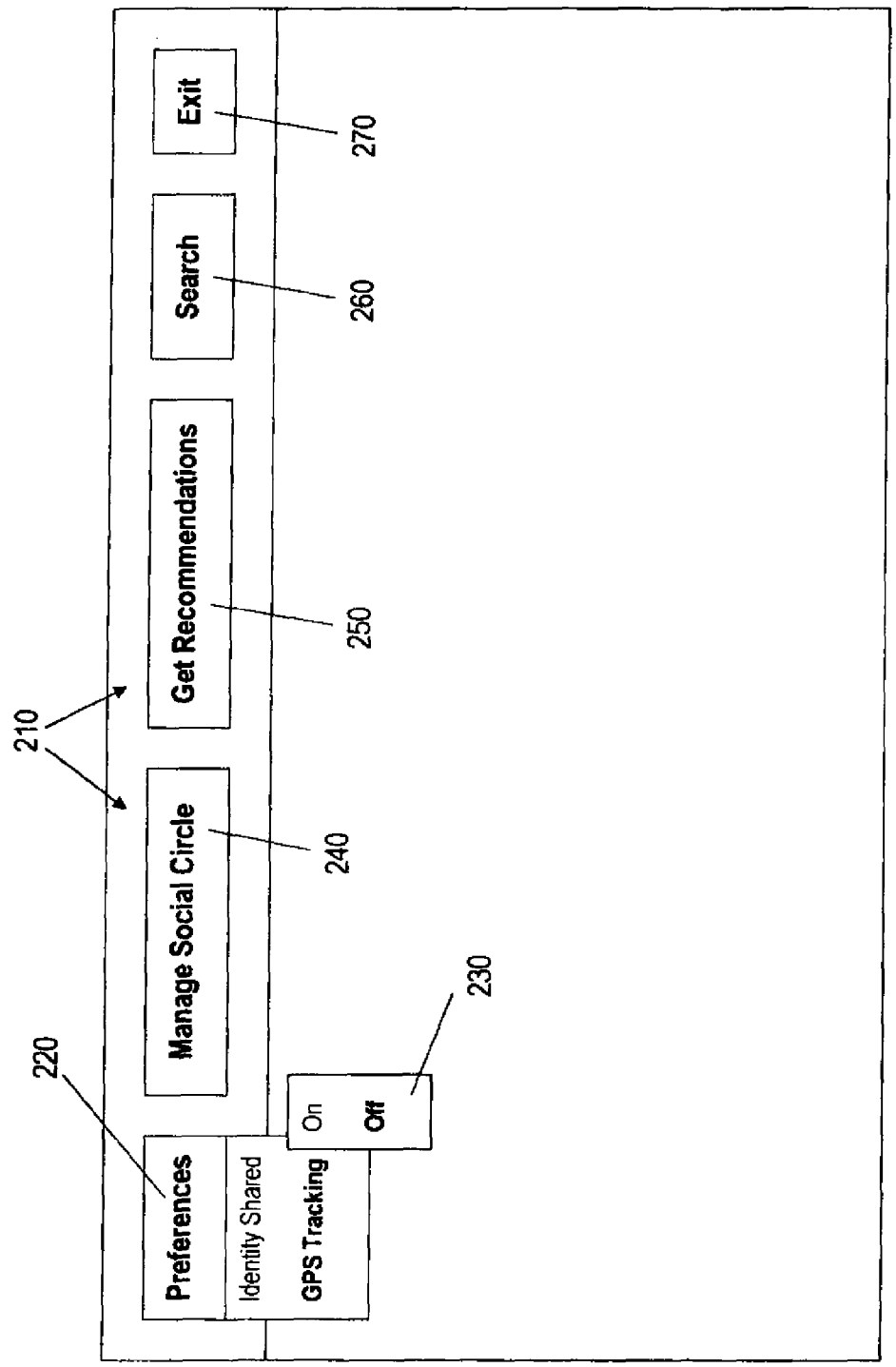
FIG. 2 is a block diagram of illustrative menus available within the social circle application.

Upon executing the social circle application 145, the customer is presented with one or more drop-down menus, including those drop-down menus 210 illustrated by FIG. 2. The customer may be a member of another's social circle. By selecting the "Preferences" drop-down menu 220, the customer may set the customer's own preferences. For example, the customer may elect not to provide physical location information to others. The physical location information may be tracked by the global positioning system 160 or other location sensing system and stored in the database 155. Similarly, the customer may elect to block or provide the customer's own recommendations and purchasing history to another either anonymously or in association with the customer's identity. Moreover, the customer may change preferences at will by accessing the "Preferences" drop-down menu 220 from within the social circle application 145.

The "Preferences" drop-down menu 220 provides a means for the customer to control the flow of the customer's information, including physical location, recommendations, and purchase history, to others who include the customer as a member of their social circles. Those who may identify the customer as a member of their social circle include other customers using the same telecommunications provider as the customer and those using a different telecommunications provider, that provider maintaining a similar social circle system which is configured to be compatible with, i.e. able to provide information to and receive information from, the social circle system maintaining the customer's social circle. This allows, for example, a customer of one telecommunication company to exchange information with a customer of another telecommunication company who includes the former as a member of the latter's social circle. Moreover, an Internet service, such as Yahoo or Hotmail, may also be configured to maintain customer social circles and allow the exchange of information between their customers and customers of a telecommunications provider, such as Sprint.

By selecting the "Manage Social Circle" drop-down menu 240, the customer may delete members from and/or add members to the first level of the social circle. The customer may create smaller, lower-level groups, or mini-social circles, consisting of one or more members of the first level of the social circle. Thus, this drop-down menu 240 permits the customer to create multiple social circles, or mini-social circles, below the first level social circle, multiple social circles within each mini-social circle, and so on, where members of one mini-social circle may or may not be included in another mini-social circle. This ability allows the customer to create many levels to the social circle, each level corresponding to some category of significance to the customer, for example, a mini-social circle for "relatives" and within that mini-social circle, another mini-social circle for "brothers" and yet another for "sisters".

Also using the drop-down menu 240, the customer may associate various categories of products and services with members of the social circle and mini-social circles, thereby limiting or restricting the type of recommendations and purchase history received from a member or mini-social circle to particular categories of products and services. For example, the customer may group "co-workers" into a mini-social circle and elect to receive recommendations and purchase history from members of this mini-social circle regarding only "office products", but not "home appliances" or "music", by associating that mini-social circle with "office products". As another example, the customer may elect to receive recommendations and purchase history regarding music only from specific friends by associating "music" with those friends.

By selecting the "Get Recommendations" drop-down menu 250, the customer may retrieve recommendations and purchase history from members of the social circle stored in the database 155. Upon selecting the "Get Recommendations" drop-down menu 250, a list of products and services is presented. From this list, the customer may choose a category of product or service, for example, "restaurants". In response to this selection, the social circle application 145 accesses the database 155 and retrieves, or pulls, recommendations and purchase history for "restaurants" from those designated members of the social circle. The designated members may include any mini-social circles or selected social circle members that the customer desires to receive "restaurant" recommendations from.

In the preferred embodiment, the customer receives recommendations and purchase history from the social circle using the "Get Recommendations" drop-down menu 250. If the social circle has no recommendations or purchase history to share, the customer may then seek to perform an Internet search. By selecting the "Search" drop-down menu 260, the customer may choose an Internet search engine, for example Google, and upon selection, be provided with a window with which the customer can execute the search engine 150. This drop-down menu 260 provides a means for the customer to browse the Internet and/or search for specific information.

Finally, the server 135, referring again to FIG. 1, implements methods for managing social circles. Through its connection to the communications tower 115, the server 135 provides a means for the customer to access and execute the social circle application 145 and to receive information retrieved by this application 145 from the database 155. The server 135 also stores information provided by the global positioning system 160, or other location sensing system, in the database 155, evaluates this information, and transmits it to the customer when appropriate conditions are triggered and customer preferences permit. The server 135 also provides a means for the social circle application 145 to access the search engine 150 when directed by the customer from within the application 145.

Although only one server 135 is shown, it is to be understood that multiple servers may simultaneously connect to the network 110 in order to distribute the demand placed on the system. Such a distribution among multiple servers may cause the social circle system to operate faster and more reliably. For instance, even if one server fails, others may remain operational and customers may still be access the social circle system. Similarly, a single cellular telephone 120, laptop 125, and desktop 130 are depicted. It is to be understood, however, that multiple cellular telephones, laptops, and desktops may simultaneously connect to the server 135 via the communications tower 150 or computer network 110 and that the single devices are intended to represent one or more such devices.

Figure 3:
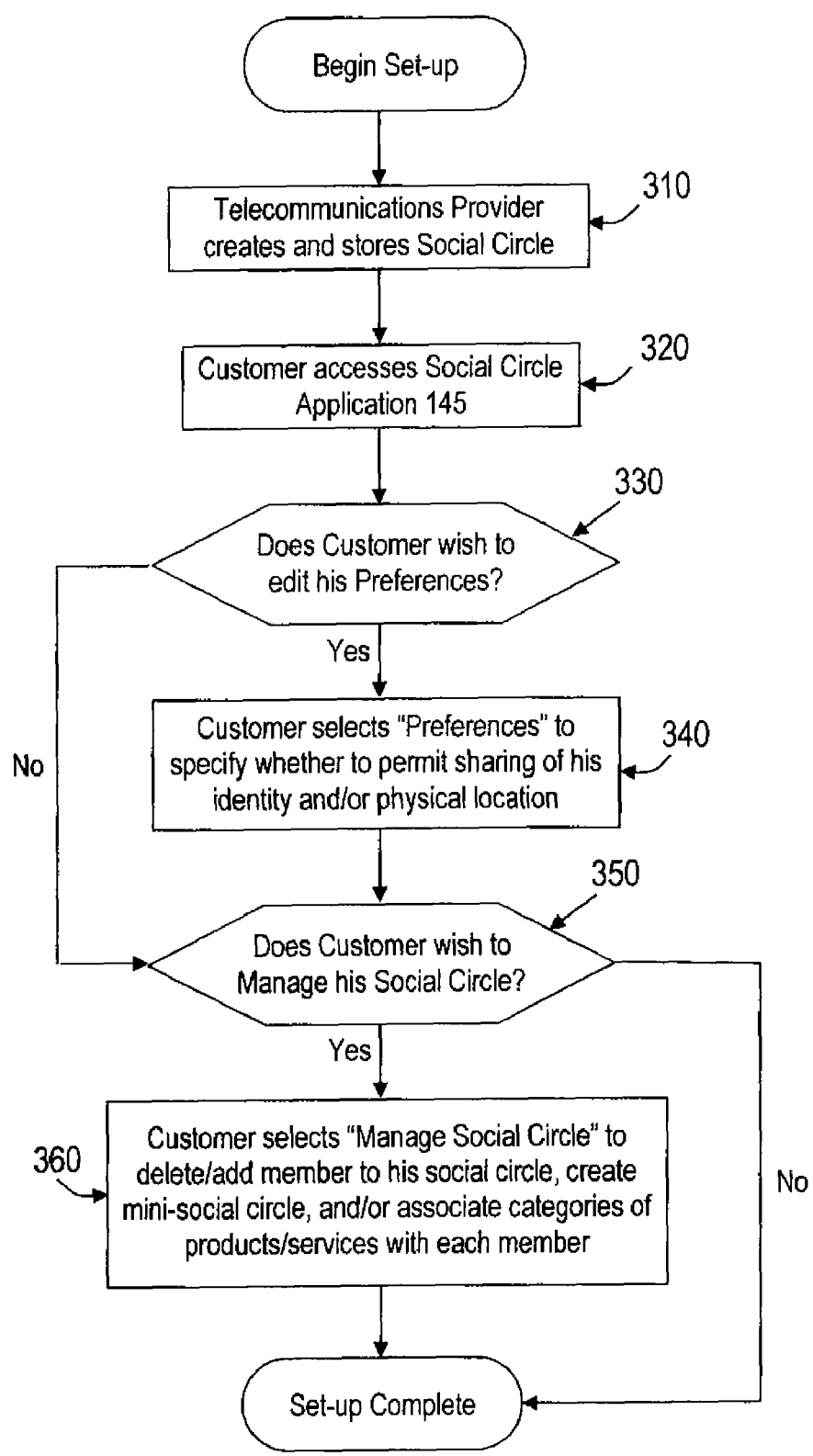
FIG. 3 is a logic diagram for an illustrative method of specifying customer preferences and managing social circles maintained as part of the social circle system.

Referring next to FIG. 3, a flowchart is provided to illustrate various method embodiments for managing information transmitted by and received from the social circle system. The method embodiments begin when the telecommunications provider creates a social circle for a customer by monitoring contacts made by the customer using mobile communications devices, including the customer's cellular telephone 120, pager, and push-to-talk, text messaging, and/or instant messaging devices, and then storing identified contacts as the first level of the customer's social circle in the database 155 (block 310). The customer accesses the social circle application 145

(block 320) to view the customer's social circle. The customer may access this application 145 using a mobile communications device, including the customer's cellular telephone 120 and laptop 125, or networked communications device, including the customer's desktop 130.

Having accessed the social circle application 145, the customer is presented with several drop-down menus 210 (recall FIG. 2), including the "Preferences" drop-down menu 220 and the "Manage Social Circle" drop-down menu 240. The "Exit" button 270 provides a means to exit the social circle application 145. If the customer wishes to edit the preferences (block 330), the customer selects the "Preferences" drop-down menu 220 and makes appropriate choices from sub-menus as they are presented (block 340). The customer may elect not to provide the customer's physical location, as tracked by the global positioning system 160 or other location sensing system and stored in the database 155. If so, the customer may select "GPS Tracking" from the "Preferences" drop-down menu 220 and "Off" from sub-menu 230. As a result of these selections, the customer's physical location information will not be provided to others.

Recommendations are express, while purchase history infers a recommendation. The customer may elect that both the customer's own recommendations and purchasing history be provided to others. The customer may elect that the customer's own recommendations, but not purchase history, be provided to others, or vice versa. Also, the recommendations may be provided, in this embodiment, either anonymously or in association with the customer's identity by selecting "Identity Shared" from the "Preferences" drop-down menu 220 and making the appropriate choice from its sub-menu.

Moreover, the customer may change preferences at will by accessing the "Preferences" drop-down menu 220 from within the social circle application 145. Further, the customer may have different preferences for different people. For example, the customer may be willing to share location information or restaurant choices with everyone in the customer's family, but not with co-workers.

The customer may wish to manage their social circle (block 350). If so, the customer selects the "Manage Social Circle" drop-down menu 240 (block 360), and more options 245, illustrated by FIG. 4, may be provided. The options 245 include listing the members of the social circle, adding a new member, deleting a member, creating a mini-social circle from one or more members of the social circle, deleting a mini-social circle, listing mini-social circles, and associating categories of products or services with members of the social circle or mini-social circles.

These options 245 may promote management of social circles, may allow for control of categories of product or service recommendations, a purchase history the customer receives from particular members of the customer's social circle, and so on. These options 245 may also allow recommendations and purchase history from one level of or mini-social circle within the social circle, but not from others. These options 245 may also allow recommendations, but not purchase history, from one level of or mini-social circle within the social circle, or vice versa. It should be appreciated that the present disclosure and exemplary user interfaces are intended to be illustrative. The present disclosure is not limited or restricted to these disclosed user interfaces or menus, and other options and features will readily suggest themselves to one skilled in the art in light of the present disclosure.

Figure 5:
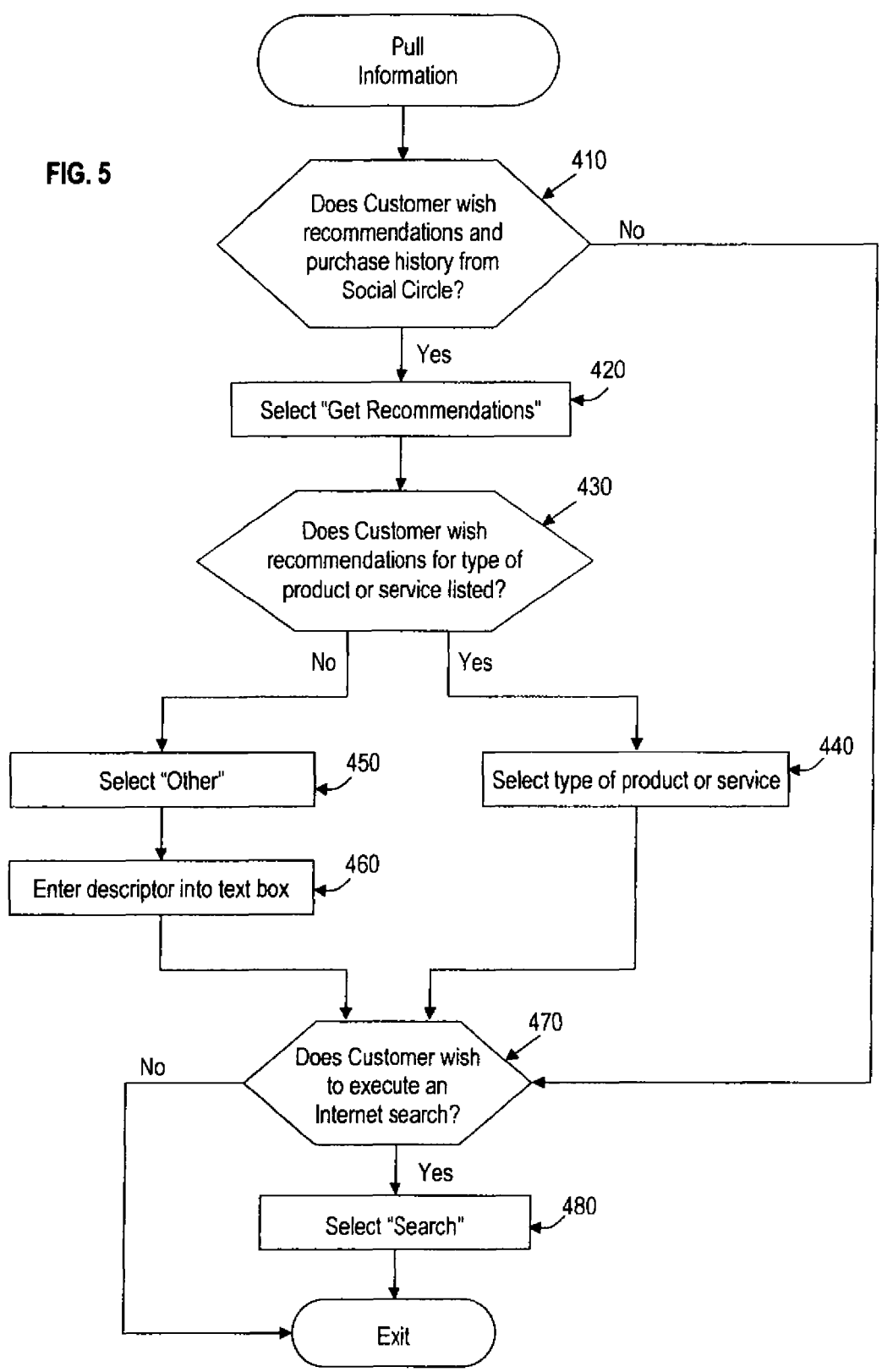
FIG. 5 is a logic diagram of an illustrative method of pulling information from the social circle system.

Referring next to FIG. 5, a flowchart is provided to illustrate various method embodiments for retrieving, or pulling, information from the social circle system. The method embodiments begin when the customer accesses the social circle application 145, as described previously. Upon accessing this application 145, the customer is presented with several drop-down menus 210 (recall FIG. 2), including the "Get Recommendations" menu 250 and the "Search" menu 260.

Figure 6:
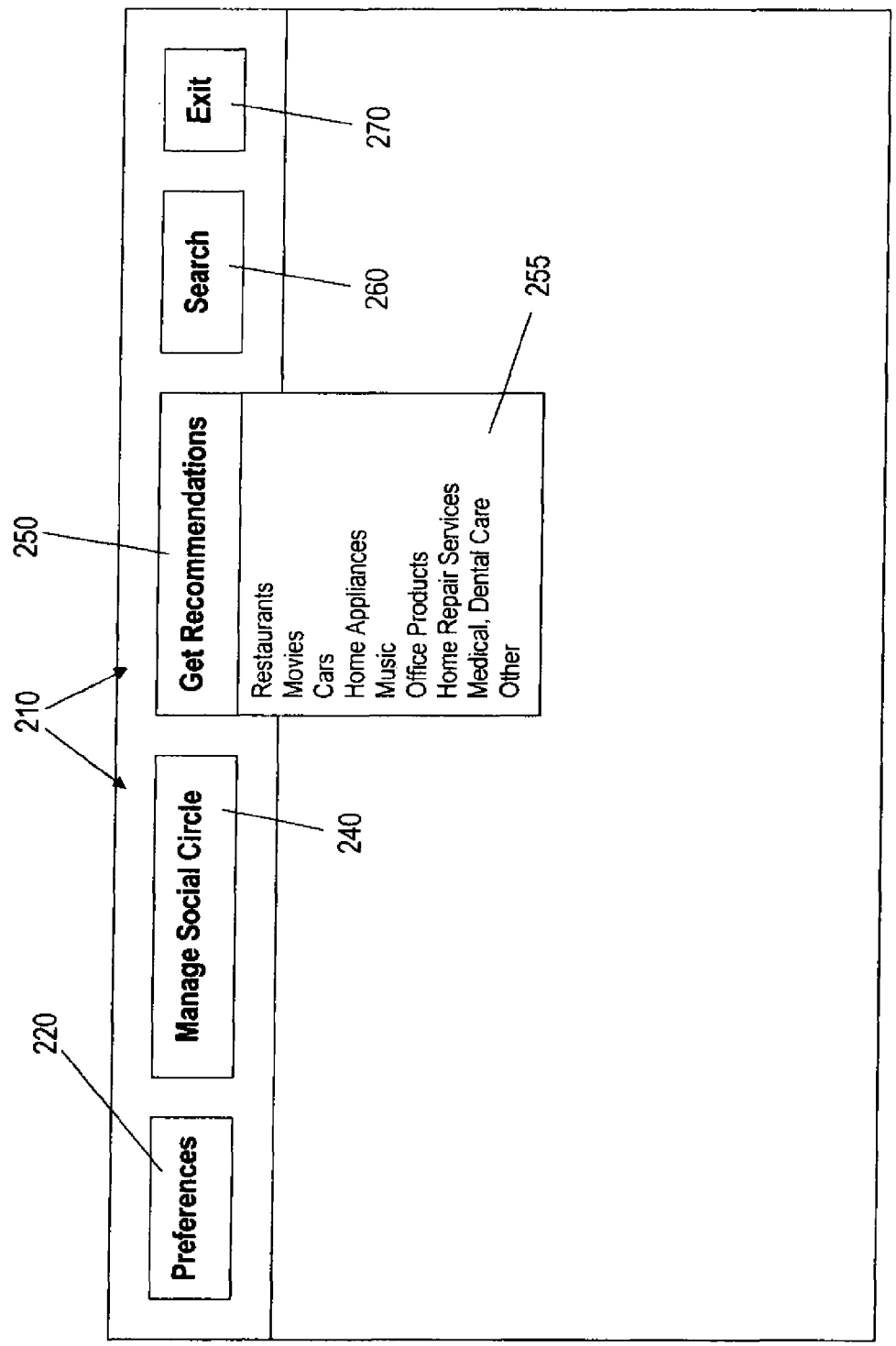
FIG. 6 is a block diagram of illustrative options available under the "Get Recommendations" menu within the social circle application.

If the customer wishes to pull recommendations and purchase history for a product or service from members of the customers social circle (block 410), the customer selects the "Get Recommendations" menu 250 (block 420). Having selected this menu 250, a list 255 containing one or more categories of products or services is provided that includes restaurants, movies, cars, and the like, as illustrated by FIG. 6. At the end of this list 255, an option labeled "Other" is also included. The customer may select a product or service from the list 255. Upon selection, the social circle application 145 is configured to pull the desired information from the database 155 and transmit the information to the customer.

Alternatively, the customer may choose "other" if the product or service and related a recommendation and purchase history does not appear on the list 255. In this case, a text box may appear in a pop-up window permitting the customer to enter a descriptor for the product or service about which recommendations and purchase history information is sought. Upon entering a descriptor, the social circle application 145 is configured to search the database 155 for recommendations and purchase history associated with the descriptor. If the information sought is found in the database 155, the social circle application 145 is configured to pull the information and transmit it to the customer. Otherwise, the application 145 is configured to transmit a message indicating that no recommendations or purchase history for relating to the descriptor were found.

Figure 4:
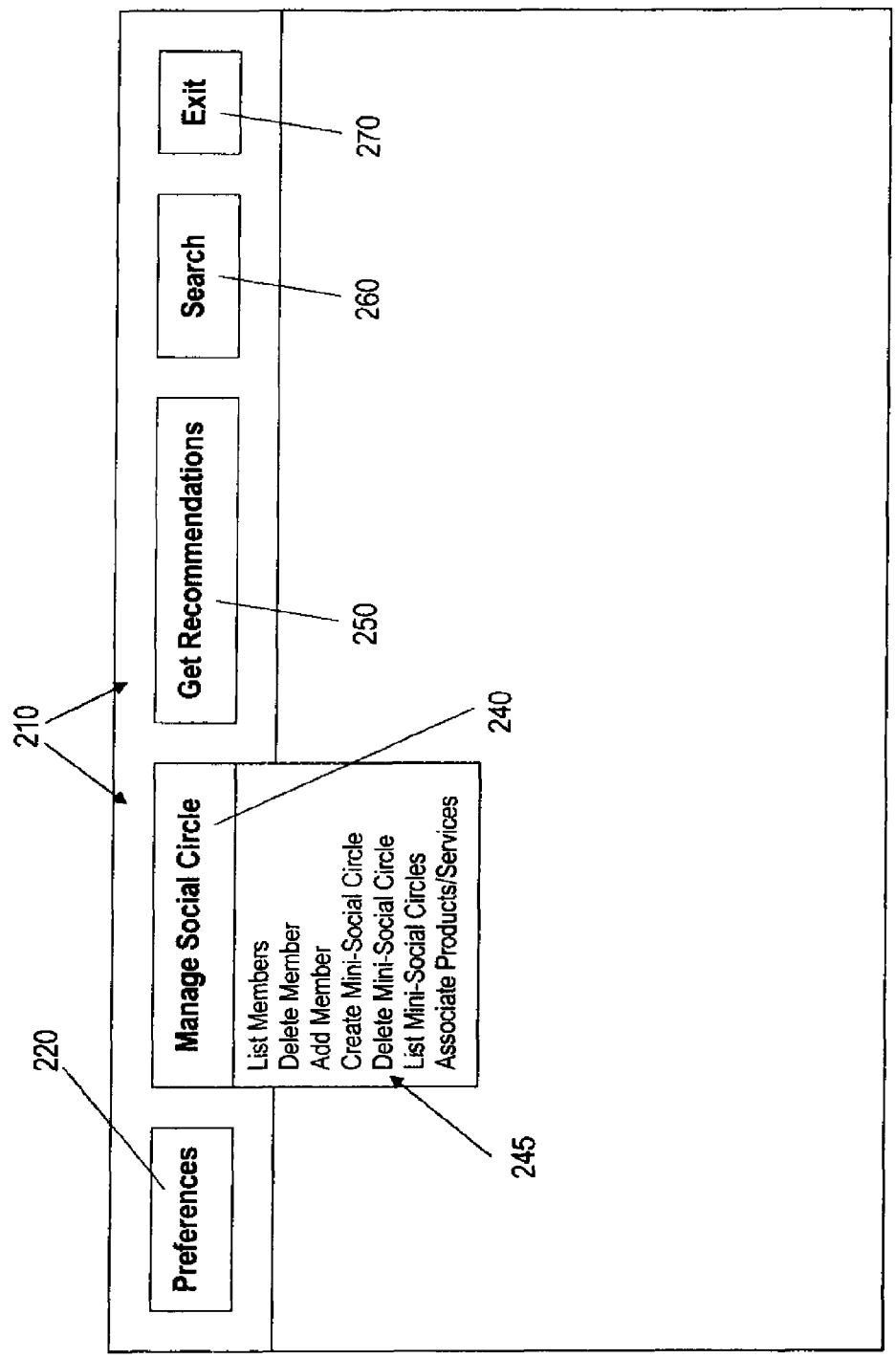
FIG. 4 is a block diagram of illustrative options available under the "Manage Social Circle" menu within the social circle application.

Whatever selection the customer makes from this list 255, the social circle application 145 is configured to pull recommendations and purchase history only from members of the social circle that the customer has selected to be associated with that particular category of product or service (recall block 360 of FIG. 3 and options 245 of FIG. 4). For example, if the customer selects "restaurants" from this list 255, the social circle application 145 is configured to pull "restaurant" recommendations and purchase history only from members of the customer's social circle that the customer has associated with "restaurants".

As an alternative or in addition to pulling recommendations and purchase history from the customer's social circle, the customer may wish to perform an Internet search (block 470 of FIG. 6). If so, the customer selects the "Search" drop-down menu 260 (block 480). Upon making this selection, a list of one or more Internet search engines 150, like Google or Yahoo, is provided. The customer may select a search engine 150 from the list. Upon making this selection, a pop-up window will appear permitting the customer to enter a search term or expression for which the search engine 150 will execute an Internet search. The social circle application 145 is configured to transmit the results of this Internet search to the customer.

FIGS. 2 through 6 illustrate method embodiments in which the customer accesses the social circle application 145 to specify preferences, manage the social circle, and/or pull recommendations and purchase history from members of the social circle. These actions are customer-initiated. In some embodiments, the social circle system, rather than the customer, will initiate the transfer of recommendations and purchase history to the customer. In these scenarios, the social circle system will initiate the transfer of information in response to a triggering event.

Triggering events may include a search term entered by the customer into the search engine 150 (recall block 470 of FIG. 5 and "Search" drop-down menu 260 in FIG. 6) or an online purchase made by the customer. In such scenarios, the social circle application 145 is configured to respond to the search or purchase by conducting a search of the database 155 for recommendations and purchase history of products or services which are the same or similar to those searched or purchased. For example, the customer accesses the social circle application 145 to conduct an Internet search of "televisions". This search is a triggering event which causes the social circle application 145 to search recommendations and purchase history of the customer's social circle to find information relating to "televisions" and if found, transmit that information to the customer. As another example, the customer seeks an online listing of current movies showing at a local theater. The movie search is a triggering event that causes the social circle application 145 to search recommendations and purchase history of the customer's social circle relating the movie search. The customer may be considering a movie and find it helpful to know that a member of the customer's social circle recently made an online purchase of tickets to a particular movie or that a member recommended a movie.

A triggering event may be a determination by the server 135, upon evaluation of physical location data received from the GPS 160 and stored in the database 155, that a member of the customer's social circle is in proximity to the customer. As described previously, the global positioning system 160 continuously tracks signals transmitted by mobile communications devices, including cellular telephones 120 or other devices, carried by members of the customer's social circle and the customer. In some embodiments, the server 135 receives this information from the GPS 160 and stores it in the database 155. Using this information, the server 135 determines the proximity of the customer to members of the customer's social circle and if defined conditions are satisfied, or in other words, a triggering event occurs, the server 135 is configured to push the identity and location of that member to the customer.

As previously described, a triggering event may occur when a member of the customer's social circle is determined to be in proximity to the customer, where the degree of proximity may vary from one member to the next depending upon the member's profile, e.g. a resident of the customer's home city or not. Returning to the example raised earlier, the server 135 may determine that the customer's relative, a member of the customer's social circle, is at a nearby Starbuck's and transmit this information to the customer. As another example, the server 135 may determine that the customer's parent, who resides in a different city than the customer, is in the customer's home city and transmit this information to the customer. Thus proximity triggers might be based on the user's current location. When the user is in their home city, a trigger might only alert the user when individuals in their social circle are very near, i.e. a few blocks or miles away. When the user travels to another city, a trigger might alert the user when individuals in their social circle are anywhere in the same city or perhaps a greater or lesser distance from the user. In some embodiment, these proximities might be defined or managed by the user.

In still other embodiments, when no recommendations or purchase information is available from the customer's social circle or mini social circles, the search may be broadened to an extended social circle. This may occur when the customer is searching for a restaurant while on vacation in a new city or country. The members of the social circles of each member of the customer's social circle may be thought of as being one degree or relationship separated from the customer, i.e. part of the customer's social circle, but just further removed. Although these individuals are a degree of separation from the members of the customer's social circle, they may still provide more similar or preferable recommendations or suggestions than the recommendations of individuals completely unrelated to the customer. Thus, when no recommendations are available from the immediate social circle, the customer may select to extend the search one, two, or perhaps more degrees of separation to obtain recommendations or other information.

According to embodiments of the present disclosure, the telecommunication provider will continue to actively monitor the customer's usage patterns, such as with whom the customer communicates, whether these communications are via text, voice, or other mode, and how frequently these communications occur. As the usage patterns change over time, new individuals may be periodically added to the list and some individuals may be removed from the social circle list. In some embodiments, these individuals may be automatically added and removed, while in still other embodiments, the customer may have the option to confirm before individuals are added or removed from the social circle.

Figure 7:
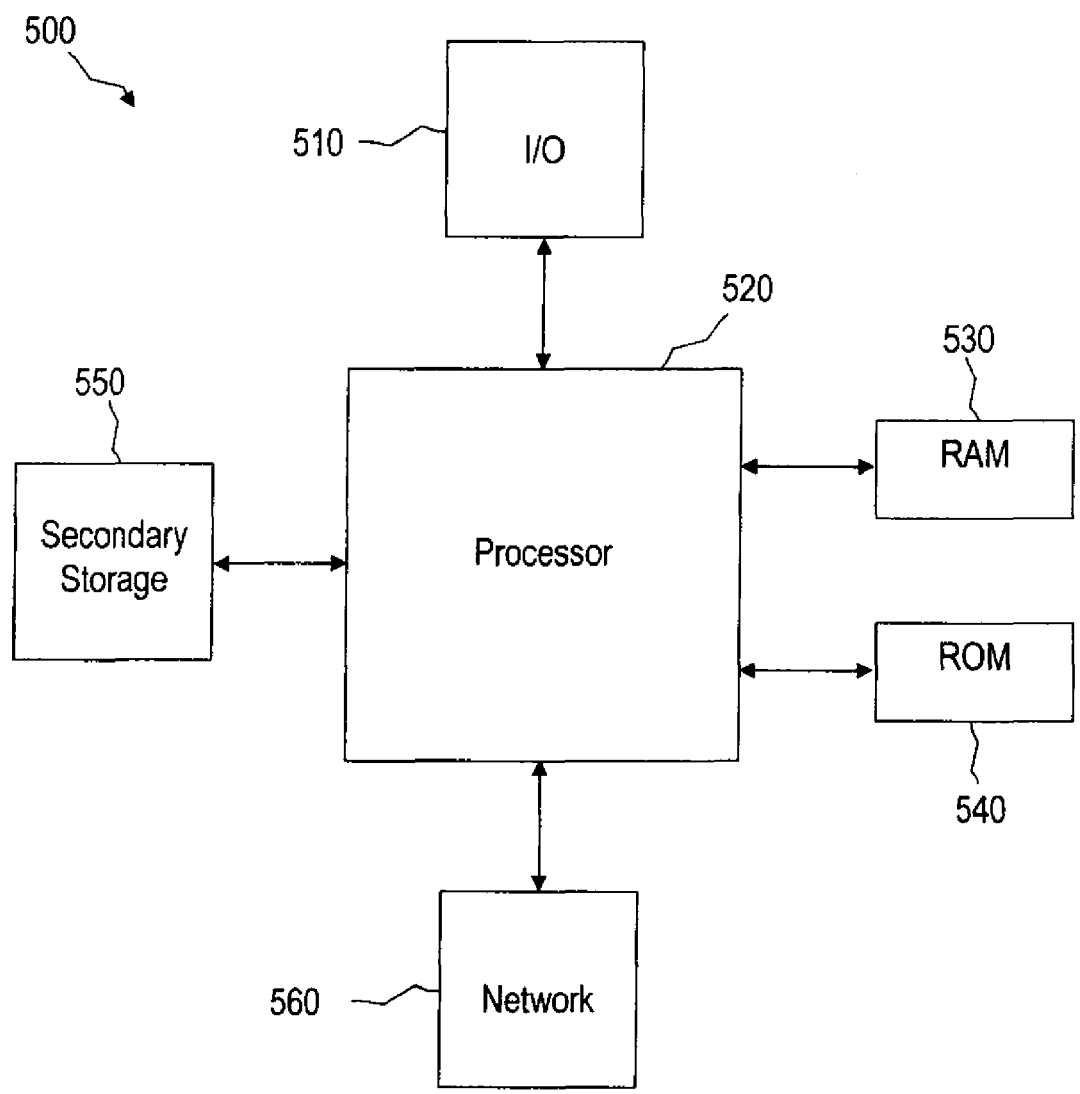
FIG. 7 is an illustrative general purpose computer system suitable for maintaining the social circle system.

The systems and methods described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 500 includes a processor 520 (which may be referred to as a central processor unit or CPU) that is in communication with memory devices including secondary storage 550, read only memory (ROM) 540, random access memory (RAM) 530, input/output (I/O) 510 devices, and network connectivity devices 560. The processor may be implemented as one or more CPU chips.

The secondary storage 550 is typically comprised of one or more disk drives or tape drives and is used for non-volatile storage of data and as an over-flow data storage device if RAM 530 is not large enough to hold all working data. Secondary storage 550 may be used to store programs which are loaded into RAM 530 when such programs are selected for execution. The ROM 540 is used to store instructions and perhaps data which are read during program execution. ROM 540 is a non-volatile memory device which typically has a small memory capacity relative to the larger memory capacity of secondary storage. The RAM 530 is used to store volatile data and perhaps to store instructions. Access to both ROM 540 and RAM 530 is typically faster than to secondary storage 550.

I/O 510 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 560 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 560 devices may enable the processor 520 to communicate with an Internet or one or more intranets. With such a network connection, it is contemplated that the processor 520 might receive information from the network, or might output information to the network in the course of performing the above-described method steps. Such information, which is often represented as a sequence of instructions to be executed using processor 520, may be received from and outputted to the network, for example, in the form of a computer data signal embodied in a carrier wave.

Such information, which may include data or instructions to be executed using processor 520 for example, may be received from and outputted to the network, for example, in the form of a computer data baseband signal or signal embodied in a carrier wave. The baseband signal or signal embodied in the carrier wave generated by the network connectivity 560 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 520 executes instructions, codes, computer programs, scripts which it accesses from hard disk, floppy disk, optical disk (these various disk based systems may all be considered secondary storage 550), ROM 540, RAM 530, or the network connectivity devices 560.

While several embodiments have been provided in the present disclosure, it should be understood that the disclosed systems and methods may be embodied in many other specific forms without departing from the spirit or scope of the present disclosure.

The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system using social circles, comprising:
a data store in a non-transitory computer readable media that stores a social circle listing individuals, the social circle members identified by monitoring individuals that a customer communicates with via the customer's mobile device, the data store further maintaining recommendations and purchase histories associated with the individuals of the social circle;
instructions stored in a non-transitory computer media that when executed by a processor promote the processor to:
manage the individuals of the social circle,
search for businesses and products, and
retrieve recommendations and purchase histories from the data store associated with the searched businesses and products;
a global positioning system to track the physical location of mobile devices of the customer and at least some of the individuals of the customer's social circle; and
the processor further configured to:
retrieve the physical location of at least one member of the social circle; and
provide the physical location of the at least one member of the social circle to the customer related to the search for businesses and products.

2. A system using social circles, comprising:
a data store in a non-transitory computer readable media that stores a social circle listing first individuals and an extended social circle listing second individuals, the social circle members identified by monitoring individuals that a customer communicates with via the customer's mobile device, the extended social circle identified as individuals who are members of social circles of members of the customer's social circle and that are not members of the customer's social circle, the data store further maintaining recommendations and purchase histories associated with the individuals of the social circle and recommendations and purchase histories associated with the individuals of the extended social circle; and
instructions stored in a non-transitory computer media that when executed by a processor promote the processor to:
manage the individuals of the social circle and the extended social circle, search for businesses and products, and
retrieve recommendations and purchase histories associated with the individuals of the social circle associated with the searched businesses and products from the data store when there are recommendations or purchase histories associated with the individuals of the social circle associated with the searched business and products; and
retrieve recommendations and purchase histories associated with the individuals of the extended social circle associated with the searched businesses and products from the data store when there are no recommendations and purchase histories associated with the individuals of the social circle associated with the searched businesses and products contained in the data store.

* * * * *